US012706675B2

(12) United States Patent
Ge et al.

(10) Patent No.: US 12,706,675 B2
(45) Date of Patent: Aug. 11, 2026

(54) DISTRIBUTED WIRELESS SYSTEM AND APPARATUS

(71) Applicant: Huawei Technologies Co., Ltd., Shenzhen (CN)

(72) Inventors: Jinxin Ge, Nanjing (CN); Xiaoliang Gong, Shenzhen (CN); Jianhua Xu, Nanjing (CN); Shuai Yuan, Nanjing (CN); Chao Ren, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 231 days.

(21) Appl. No.: 18/417,269

(22) Filed: Jan. 19, 2024

(65) Prior Publication Data

US 2024/0162988 A1 May 16, 2024

Related U.S. Application Data

(63) Continuation of application No. PCT/CN2022/106412, filed on Jul. 19, 2022.

(30) Foreign Application Priority Data

Jul. 21, 2021 (CN) ......................... 202110826334.4
Aug. 20, 2021 (CN) ......................... 202110958250.6

(51) Int. Cl.
*H04B 10/29* (2013.01)
*H04B 10/2575* (2013.01)

(52) U.S. Cl.
CPC ....... *H04B 10/29* (2013.01); *H04B 10/25759* (2013.01)

(58) Field of Classification Search
CPC .......................... H04B 10/25759; H04B 10/29
USPC .......................................................... 398/75
See application file for complete search history.

(56) References Cited

U.S. PATENT DOCUMENTS 9,060,382 B2 * 6/2015 Ridel .................. H04W 88/085
9,838,126 B2 * 12/2017 Kim ................. H04B 10/25752
10,064,149 B1 * 8/2018 Anvari ............. H04W 56/0015
10,466,432 B2 * 11/2019 Luo .......................... G02B 6/43
(Continued)

FOREIGN PATENT DOCUMENTS

CN 1484875 A * 3/2004 ............ H01Q 21/08
CN 101459454 A 6/2009
(Continued)

OTHER PUBLICATIONS

P. Hartmann et al., "Wideband fibre-agnostic DAS using pluggable analogue optical modules", Microwave Photonics, 2006. MWP "06. International Topical Meeting On IEEE, PI, Oct. 1, 2006, total 4 pages.

*Primary Examiner* — Amritbir K Sandhu
(74) *Attorney, Agent, or Firm* — Slater Matsil, LLP

(57) ABSTRACT

A system includes a baseband component, an optical transceiver component, a first pluggable radio frequency component, and a wireless head-end component. The baseband component is configured to provide a radio frequency signal to the first pluggable radio frequency component through the optical transceiver component. The optical transceiver component is connected to the first pluggable radio frequency component through an optical fiber. The first pluggable radio frequency component is connected to the wireless head-end component in a plugging manner.

17 Claims, 17 Drawing Sheets

(56) References Cited

U.S. PATENT DOCUMENTS

| | | | | |
|---|---|---|---|---|
| 2015/0349892 | A1* | 12/2015 | Fischer ............ | H04B 10/25759 398/115 |
| 2018/0184404 | A1 | 6/2018 | Lemson et al. | |
| 2024/0162988 | A1* | 5/2024 | Ge .................. | H04B 10/25759 |

FOREIGN PATENT DOCUMENTS

| | | | | |
|---|---|---|---|---|
| CN | 106471756 | A | 3/2017 | |
| EP | 2651040 | B1 * | 8/2014 | ............. H01Q 21/22 |
| WO | WO-2017075093 | A1 * | 5/2017 | ........... G02B 6/3885 |
| WO | WO-2020063238 | A1 * | 4/2020 | ............... H01Q 3/26 |
| WO | WO-2020063545 | A1 * | 4/2020 | ............. H01Q 3/005 |
| WO | WO-2023001135 | A1 * | 1/2023 | ....... H04B 10/25754 |

* cited by examiner

DISTRIBUTED WIRELESS SYSTEM AND APPARATUS

CROSS-REFERENCE TO RELATED APPLICATIONS

This application is a continuation of International Application No. PCT/CN2022/106412, filed on Jul. 19, 2022, which claims priority to Chinese Patent Application No. 202110826334.4, filed on Jul. 21, 2021, and Chinese Patent Application No. 202110958250.6, filed on Aug. 20, 2021. All of the aforementioned patent applications are hereby incorporated by reference in their entireties.

TECHNICAL FIELD

This application relates to network communication technologies, and in particular, to a distributed wireless system and an apparatus used in the distributed wireless system.

BACKGROUND

Each time the wireless fidelity (Wi-Fi) protocol is upgraded, a maximum rate of the update increases and some new features are added. To experience the latest Wi-Fi protocol, customers need to replace wireless access point (AP) devices, resulting in resource wastes. In addition, because most APs are installed on the ceiling, it is inconvenient to replace the APs each time, and efficiency is low.

SUMMARY

This application provides a distributed wireless system and apparatus, used when a distributed wireless system device is upgraded to reduce upgrade costs.

According to a first aspect, this application discloses a distributed wireless system, including a baseband component, an optical transceiver component, a first pluggable radio frequency component, and a wireless head-end component, where the baseband component is configured to provide a radio frequency signal to the first pluggable radio frequency component through the optical transceiver component; the optical transceiver component is connected to the first pluggable radio frequency component through an optical fiber; and the first pluggable radio frequency component is connected to the wireless head-end component in a plugging manner.

The first pluggable radio frequency component decouples the modules of the distributed wireless system, so that the modules are upgraded on demand (only a component that does not meet an upgrade requirement needs to be upgraded), and costs of upgrading the distributed wireless system are reduced.

In a possible implementation, the distributed wireless system further includes a radio hub component (which may also be referred to as a relay device), and the radio hub component connects the optical transceiver component to the first pluggable radio frequency component through the optical fiber. The radio hub component is a relay device, so that a distance between the first pluggable radio frequency component and the optical transceiver component can be extended, so that the distributed wireless system can cover a larger range. In addition, because the distance is extended through the relay device, the number of optical fibers is reduced to some extent (only one optical fiber is required for communication between the baseband component and the radio hub component, and a baseband signal is first transmitted to the radio hub component through the optical fiber, and then sent to different first pluggable radio frequency components by the radio hub component), thereby reducing costs during system deployment.

The distributed wireless system supports deployment of a relay device and a non-relay device, so that the distributed wireless system can adapt to more deployment scenarios, thereby improving flexibility of deployment of the distributed wireless system.

In a possible implementation, the first pluggable radio frequency component includes the optical transceiver component and at least one radio frequency front-end module; and the optical transceiver component includes at least one laser, at least one laser driver, and at least one detector.

In a possible implementation, the baseband component and the optical transceiver component are located in a same physical device. In this application, when the baseband component and the optical transceiver component are integrated in the Ethernet physical device, or the optical transceiver component is connected, in a plugging manner, to a physical device to which the baseband component belongs, it is considered that the baseband component and the optical transceiver component are located in a same physical device. The optical transceiver component is connected to the baseband component in an integrated or plugging manner, thereby improving flexibility of deployment of the distributed wireless system.

For example, the physical device is a switch.

In a possible implementation, the wireless head-end component is located at a wireless access point.

In a possible implementation, the distributed wireless system replaces the first pluggable radio frequency component with a second pluggable radio frequency component, to upgrade the distributed wireless system.

For example, the first pluggable radio frequency component and the second pluggable radio frequency component are components of a same type but different specifications.

In a possible implementation, the distributed wireless system updates the baseband component, to update the system.

In a possible implementation, the optical transceiver component and the first pluggable radio frequency component or the radio hub component and the first pluggable radio frequency component are connected through an optical fiber connector or an MTP/MPO connector.

For example, the optical fiber connector is a lucent connector (LC) or a square connector (SC).

Functional components of the distributed wireless system are modularized. On one hand, the distributed system may be deployed more flexibly. On the other hand, when the distributed wireless system is upgraded, only a component that does not meet an upgrade requirement needs to be upgraded, thereby reducing device costs of the system upgrade. In addition, the wireless head-end component is generally integrated in an AP, and the AP is generally installed on the ceiling. Therefore, when the distributed wireless system is upgraded without upgrading the wireless head-end component, the upgrade efficiency is also improved accordingly.

According to a second aspect, this application provides a pluggable radio frequency component, where the pluggable radio frequency component includes an optical transceiver component and at least one radio frequency front-end module. The optical transceiver component includes at least one laser, at least one laser driver, and at least one detector.

In a possible implementation, the pluggable radio frequency component may configure a plurality of radio frequency front-end modules based on the number of antennas in the connected wireless head-end component.

In a possible implementation, the optical transceiver component may implement transmission of a multi-channel radio frequency signal by configuring a plurality of lasers, a plurality of laser drivers, and a plurality of detectors.

Through the pluggable radio frequency component, the baseband component and the wireless head-end component of the distributed wireless system may be decoupled, to implement flexible deployment of the distributed wireless system.

In a possible implementation, the pluggable radio frequency component further includes a power supply module, where the power supply module is configured to supply power to the radio frequency component, and the power supply module supports obtaining power locally or obtaining power remotely.

For example, the power supply module may be connected to an external power supply to directly obtain power locally.

For example, when the pluggable radio frequency component is plugged into the wireless head-end component in a manner of a golden finger, and the wireless head-end component is connected to an external power supply, the power supply module obtains power from the wireless head-end component.

For example, the power supply module obtains power from the optical transceiver component or the radio hub component through an optical/electrical composite cable.

Optionally, when the distributed wireless system in the first aspect supports power over Ethernet, the power supply module further includes a powered device (PD) chip.

In a possible implementation, the optical transceiver component further includes an optical fiber connector, where the optical fiber connector may be a lucent connector (LC) or a square connector (SC).

In a possible implementation, when the optical transceiver component transmits the multi-channel radio frequency signal by using a wavelength division multiplexing (WDM) technology, the optical transceiver component further includes a multiplexer and a de-multiplexer.

In a possible implementation, when the optical transceiver component transmits the multi-channel radio frequency signal by using a parallel single-mode fiber (PSM) technology, the optical transceiver component further includes an MTP (Multi-fiber Termination Push On)/MPO (Multi-fiber Push On) connector.

In a possible implementation, when the optical transceiver component transmits the multi-channel radio frequency signal by using a parallel single-mode fiber technology, the optical transceiver component further includes an optical splitter and a modulator. By using the optical splitter, the radio frequency component may implement transmission of the multi-channel radio frequency signal in a scenario including only a single laser light source, thereby reducing costs of the radio frequency component.

According to a third aspect, this application provides an optical module. The optical module includes the pluggable radio frequency component according to the second aspect or the implementations of the second aspect. The pluggable radio frequency component may be integrated on the optical module as a whole, or each component of the pluggable radio frequency component may be separately deployed on the optical module.

For technical effects of the apparatus according to the second aspect and the third aspect, refer to the technical effects of the distributed wireless system according to the first aspect.

DETAILED DESCRIPTION OF ILLUSTRATIVE EMBODIMENTS

To make a person skilled in the art better understand the technical solutions in this application, the following clearly describes the technical solutions in embodiments of this application with reference to the accompanying drawings in embodiments of this application.

All aspects, embodiments, or features are presented in this application by describing a system that may include a plurality of devices, components, modules, and the like. It should be appreciated and understood that, each system may include another device, component, module, and the like, and/or may not include all devices, components, modules, and the like discussed with reference to the accompanying drawings. In addition, a combination of these solutions may be used.

In addition, in embodiments of this application, words such as "example" and "for example" are used to represent giving an example, an illustration, or a description. Any embodiment or design scheme described as an "example" in this application should not be explained as having more advantages than another embodiment or design scheme. Exactly, use of the word example is intended to present a concept in a specific manner.

The network architecture and the service scenario described in embodiments of this application are intended to describe the technical solutions in embodiments of this application more clearly, but constitute no limitation on the technical solutions provided in embodiments of this application. A person of ordinary skill in the art may learn that the technical solutions provided in embodiments of this application are also applicable to a similar technical problem as the network architecture evolves and a new service scenario emerges.

Figure 1:
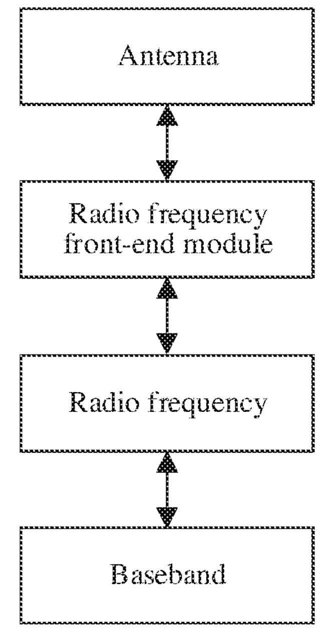
FIG. 1 is a schematic diagram of a structure of a conventional AP according to this application.

As shown in FIG. 1, a conventional AP usually includes an antenna, a radio frequency front-end module (FEM), a radio frequency, and a baseband. When the Wi-Fi protocol is upgraded, related hardware modules need to be upgraded. For example, when the AP is upgraded from Wi-Fi 5 to Wi-Fi 6, because an orthogonal frequency division multiple access (OFDMA) feature is added, the baseband needs to be upgraded. Alternatively, when a spectrum required by the AP changes, a radio frequency device needs to be upgraded. The antenna, the radio frequency front-end module, the radio frequency, and the baseband are all integrated in the AP. Therefore, each time the Wi-Fi protocol is updated, the entire AP needs to be replaced, which increases the costs of upgrading user equipment.

In view of this, this application provides a distributed wireless system. The distributed wireless system includes a baseband component, an optical transceiver component, a first pluggable radio frequency component, and a wireless head-end component. The baseband component is configured to provide a radio frequency signal to the pluggable radio frequency component through the optical transceiver component. The optical transceiver component is connected to the pluggable radio frequency component through an optical fiber. The pluggable radio frequency component is connected to the wireless head-end component in a plugging manner. Functional modules of an existing AP are decoupled into the distributed wireless system, so that when a user performs an upgrade, not all function components need to be replaced, thereby reducing costs of upgrading the user equipment.

Figure 2:
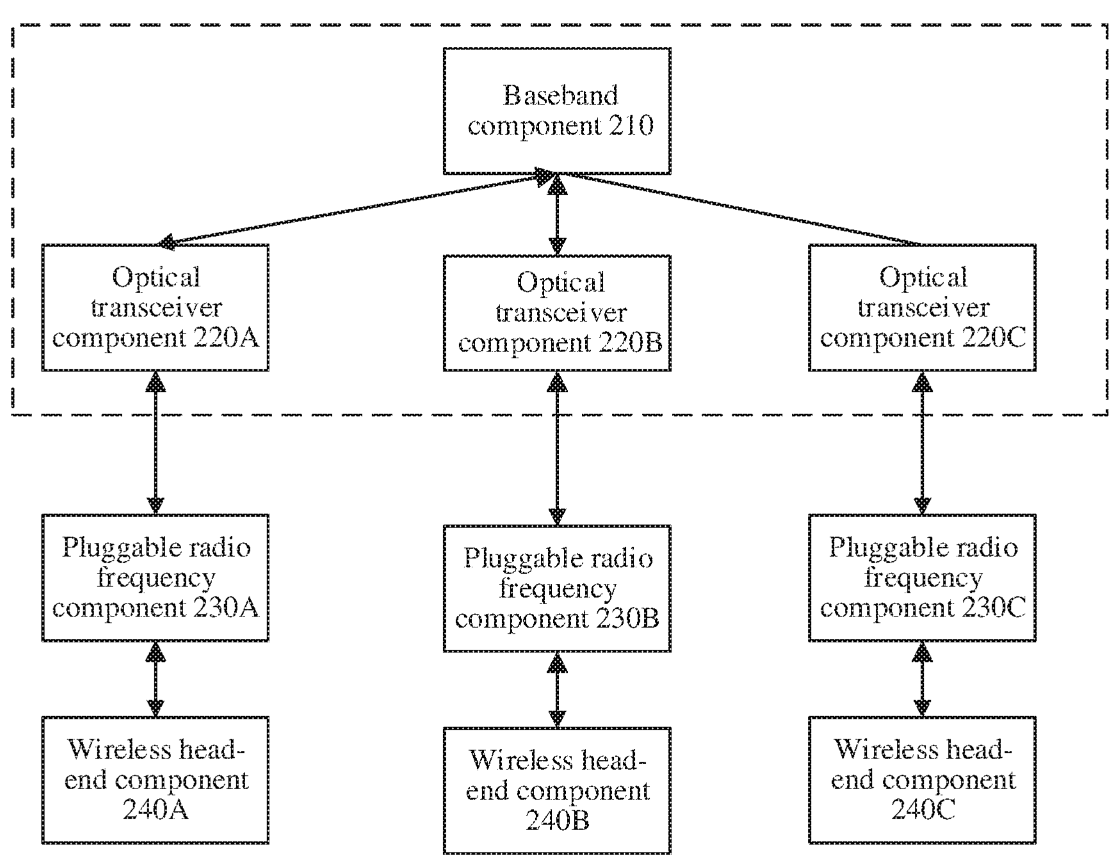
FIG. 2 is a schematic diagram of a structure of a distributed wireless system according to an embodiment of this application.

In an example, FIG. 2 is a schematic diagram of a structure of a distributed wireless system 200 according to an embodiment of this application. The distributed wireless system 200 includes a baseband component 210, an optical transceiver component 220 (220A, 220B, and 220C), a pluggable radio frequency component 230 (230A, 230B, and 230C), and a wireless head-end component 240 (240A, 240B, and 240C). The pluggable radio frequency component 230 is connected to the wireless head-end component 240 in a plugging manner. The baseband component 210 is configured to generate a radio frequency signal and process a received radio frequency signal. The optical transceiver component 220 is configured to: transmit the radio frequency signal generated by the baseband component 210 to the pluggable radio frequency component 230 over a long distance through the optical fiber; and receive the radio frequency signal from the pluggable radio frequency component 230, and send a received radio frequency signal to the baseband component 210. The pluggable radio frequency component 230 receives the radio frequency signal from the optical transceiver component 220, processes the radio frequency signal and transmits the processed signal to the wireless head-end component 240; and receives a signal from the wireless head-end component 240, processes the signal and sends the processed signal to the optical transceiver component 220. The wireless head-end component 240 is configured to send a received radio frequency signal.

Figure 3:
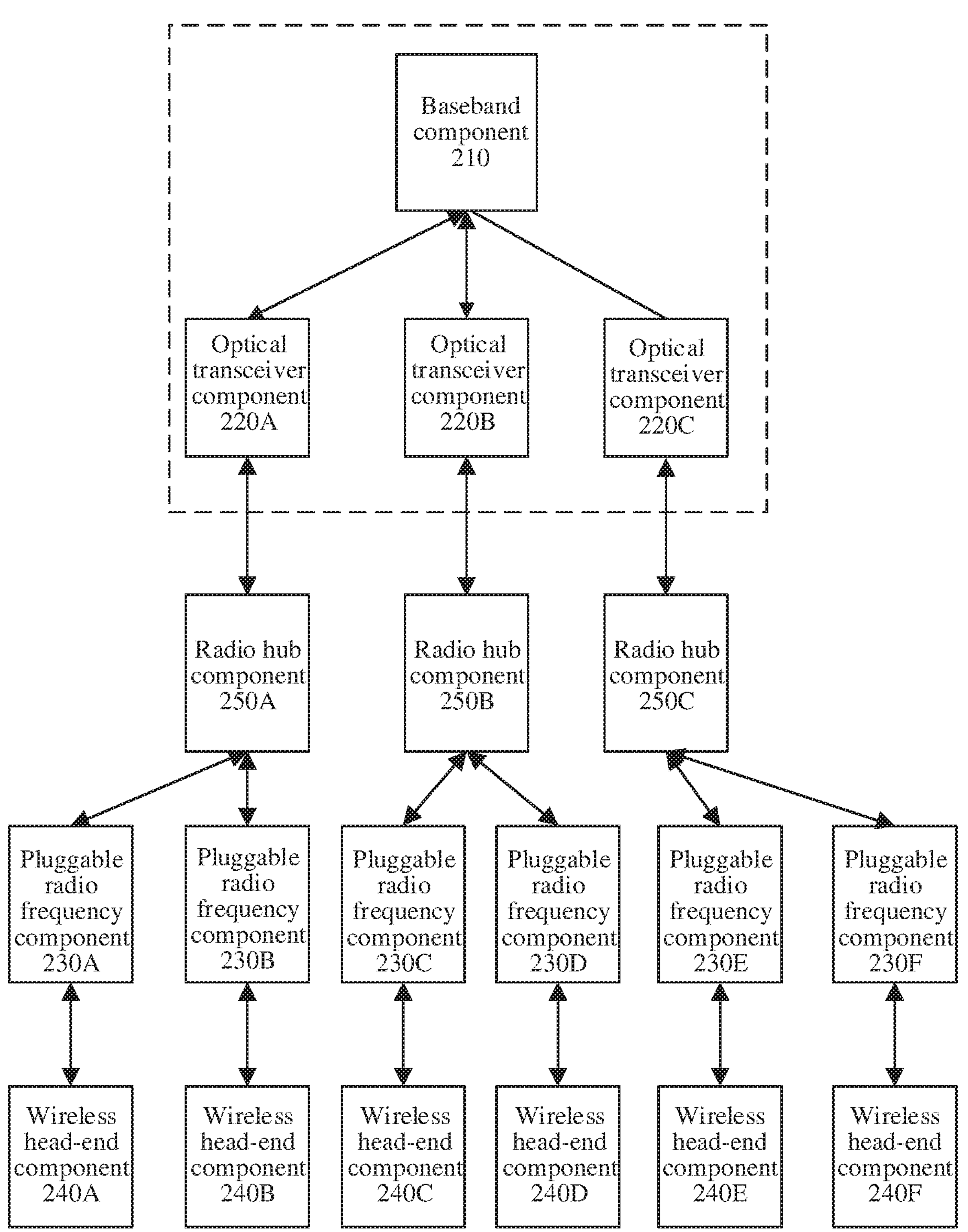
FIG. 3 is a schematic diagram of a structure of another distributed wireless system according to an embodiment of this application.

Optionally, FIG. 3 is a schematic diagram of a structure of another distributed wireless system 200 according to an embodiment of this application. The distributed wireless system 200 includes a baseband component 210, an optical transceiver component 220 (220A to 220C), a radio hub (RHUB) component 250 (250A and 250B), a pluggable radio frequency component 230 (230A to 230F), and a wireless head-end component 240 (240A to 240F). Compared with the foregoing structure of the distributed wireless system 200, the distributed wireless system 200 adds the radio hub component, as a relay device, between the optical transceiver component 220 and the pluggable radio frequency component, thereby further increasing a distance extended through the optical fiber and improving flexibility of deployment of the distributed wireless system 200.

When a component needs to be replaced during an upgrade of the distributed wireless system 200, in this application, a component before replacement is referred to as a first component, a component after replacement is referred to as a second component, and both the first component and the second component are components of a same type but different specifications. For example, if a spectrum does not change when the distributed wireless system 200 performs a protocol upgrade, only the baseband component 210 needs to be replaced. Therefore, the first baseband component 210 is replaced with the second baseband component (assumed to be 210B) to upgrade the distributed wireless system 200. If a related spectrum also changes when the protocol is upgraded, the pluggable radio frequency component 230 also needs to be replaced. Therefore, the first pluggable radio frequency component 230 is replaced with the second pluggable radio frequency component (assumed to be 230H) to upgrade the distributed wireless system 200.

For example, the first baseband component 210 supports only an orthogonal frequency division multiplexing (OFDM) feature, and the first baseband component 210 needs to be replaced with the second baseband component 210 that supports the OFDMA feature. In addition, Wi-Fi 5 supports only the 5G frequency band, and Wi-Fi 6 supports the 6E (5925 MHz to 7125 MHz) frequency band. Therefore, when the distributed wireless system 200 is upgraded from Wi-Fi 5 to Wi-Fi 6 (Wi-Fi 6 supports an OFDMA feature), the second pluggable radio frequency component 230B that supports the 6E frequency band needs to be used to replace the first pluggable radio frequency component 230 that supports only the 5G frequency band. The distributed wireless system can be upgraded by replacing only the baseband component 210 and the pluggable radio frequency component 230, without replacing the wireless head-end component 240. In this way, on one hand, costs of device upgrade are reduced. On the other hand, the wireless head-end component 240 is generally located in the AP (the AP does not include components such as the baseband, the radio frequency, the FEM, and the like), and the AP is generally installed on the ceiling. Therefore, the upgrade efficiency is improved because the wireless head-end component 240 does not need to be replaced.

The first baseband component and the second baseband component are of a same type, but have different specifications. For example, the first baseband component supports only the OFDM feature, and the second baseband component further supports the OFDMA feature. The first pluggable radio frequency component and the second pluggable radio frequency component are of a same type, but have different specifications. For example, the first pluggable radio frequency component supports only the 5G frequency band, and the second pluggable radio frequency component further supports the 6E frequency band.

In a possible implementation, as shown in FIG. 2, when the baseband component 210 sends the radio frequency signal through the optical transceiver component 220, the optical transceiver component 220 and the baseband component 210 may be integrated into a same physical device, and the physical device may be a switch.

Optionally, the optical transceiver component 220 may be further connected, in a plugging manner, to a physical device to which the baseband component 210 belongs. In this application, the optical transceiver component 220 is connected to the baseband component 210 in a plugging manner, and it is also considered that the optical transceiver component 220 and the baseband component 210 are located in a same physical device.

In a possible implementation, the optical transceiver component 220 is connected to the pluggable radio frequency component 230 through an optical fiber connector. The optical fiber connector can be an LC connector or a square connector.

Optionally, the optical transceiver component 220 is connected to the pluggable radio frequency component 230 through an MTP/MPO connector.

In a possible implementation, a radio hub component 250 is connected to the pluggable radio frequency component 230 through an optical fiber connector. The optical fiber connector can be an LC connector or a square connector.

Optionally, the radio hub component 250 is connected to the pluggable radio frequency component 230 through an MTP/MPO connector.

Figure 4:
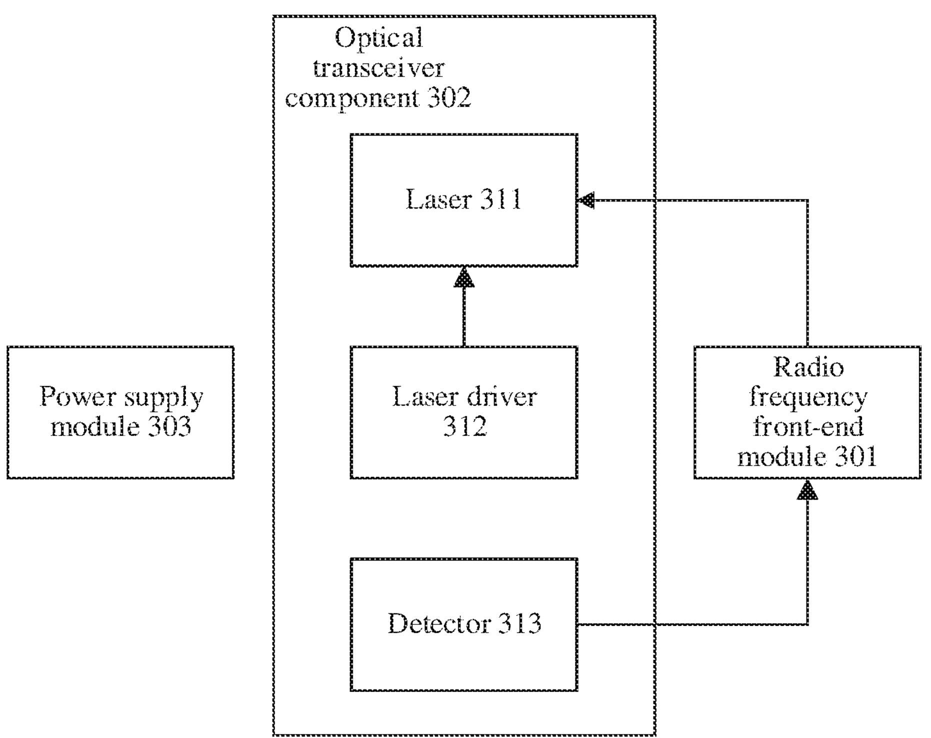
FIG. 4 is a schematic diagram of a structure of a pluggable radio frequency component according to an embodiment of this application.

As shown in FIG. 4, this application further provides a pluggable radio frequency component 300. The pluggable radio frequency component 300 includes a radio frequency front-end module 301 and an optical transceiver component 302. The radio frequency front-end module 301 is configured to switch radio frequency signal gains, amplify the radio frequency signal, and switch TX/RX switches.

Optionally, the pluggable radio frequency component 300 further includes a power supply module 303, to implement local or remote power supply.

For example, the pluggable radio frequency component 300 may be connected to an external power supply, and obtains power locally.

For example, when the pluggable radio frequency component 300 is attached to the wireless head-end component 240 in a manner of a golden finger, and the wireless head-end component 240 is connected to an external power supply, the pluggable radio frequency component 300 may also obtain power through the wireless head-end component 240.

For example, the pluggable radio frequency component 300 may further remotely obtain power from the optical transceiver component 220 through an optical/electrical composite cable.

For example, when the distributed wireless system 200 supports power over Ethernet (POE), the power supply module 303 includes a powered device (PD) chip.

The optical transceiver component 302 has different implementations, based on the number of radio frequency signal channels transmitted by the pluggable radio frequency component 300 and the manner of connecting the optical transceiver component 302 to the optical transceiver component 220 or the radio hub component 250.

In a possible implementation, when the pluggable radio frequency component 300 supports transmission of only a single-channel radio frequency signal, in an example, referring to FIG. 4, the optical transceiver component 302 includes a laser 311, a laser driver 312, and a detector 313. The laser 311 is configured to generate a laser signal under some excitation. The laser driver 312 is configured to generate excitation so that the laser 311 generates a laser signal. The detector 313 is configured to convert an optical signal into an electrical signal.

Figure 5:
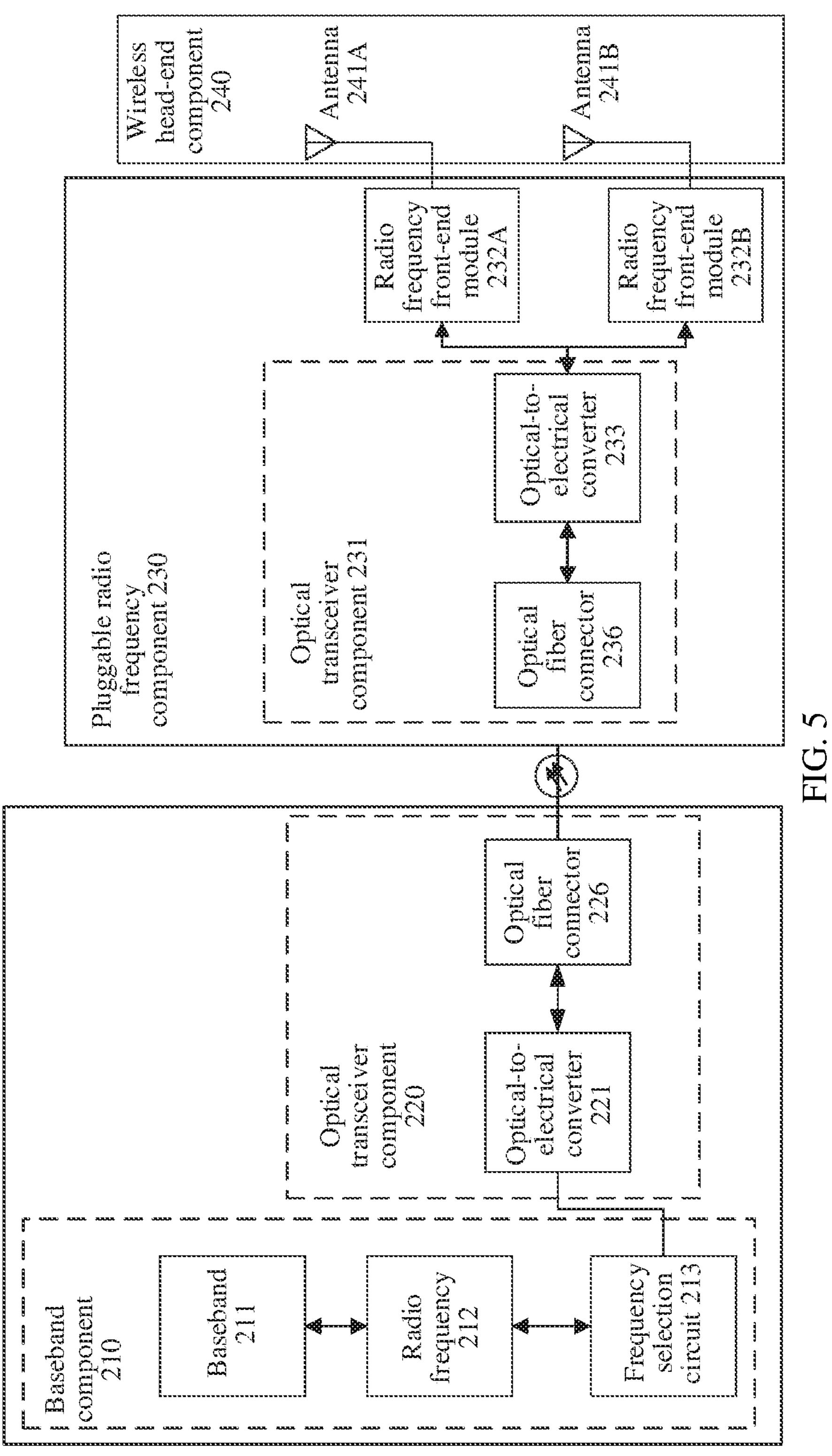
FIG. 5 is a schematic diagram of another structure of a distributed wireless system according to an embodiment of this application.
Figure 6:
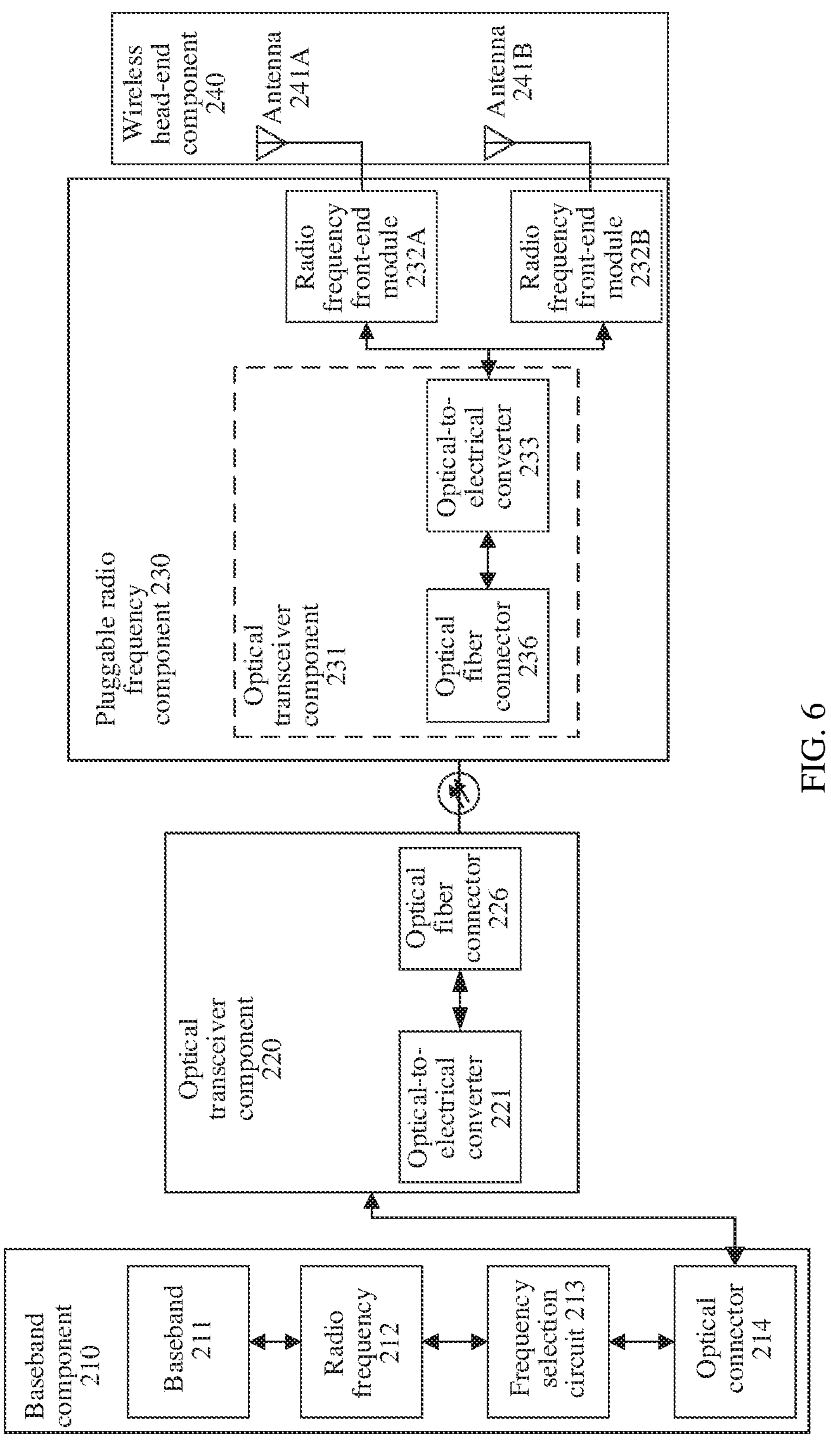
FIG. 6 is a schematic diagram of another structure of a distributed wireless system according to an embodiment of this application.
Figure 7:
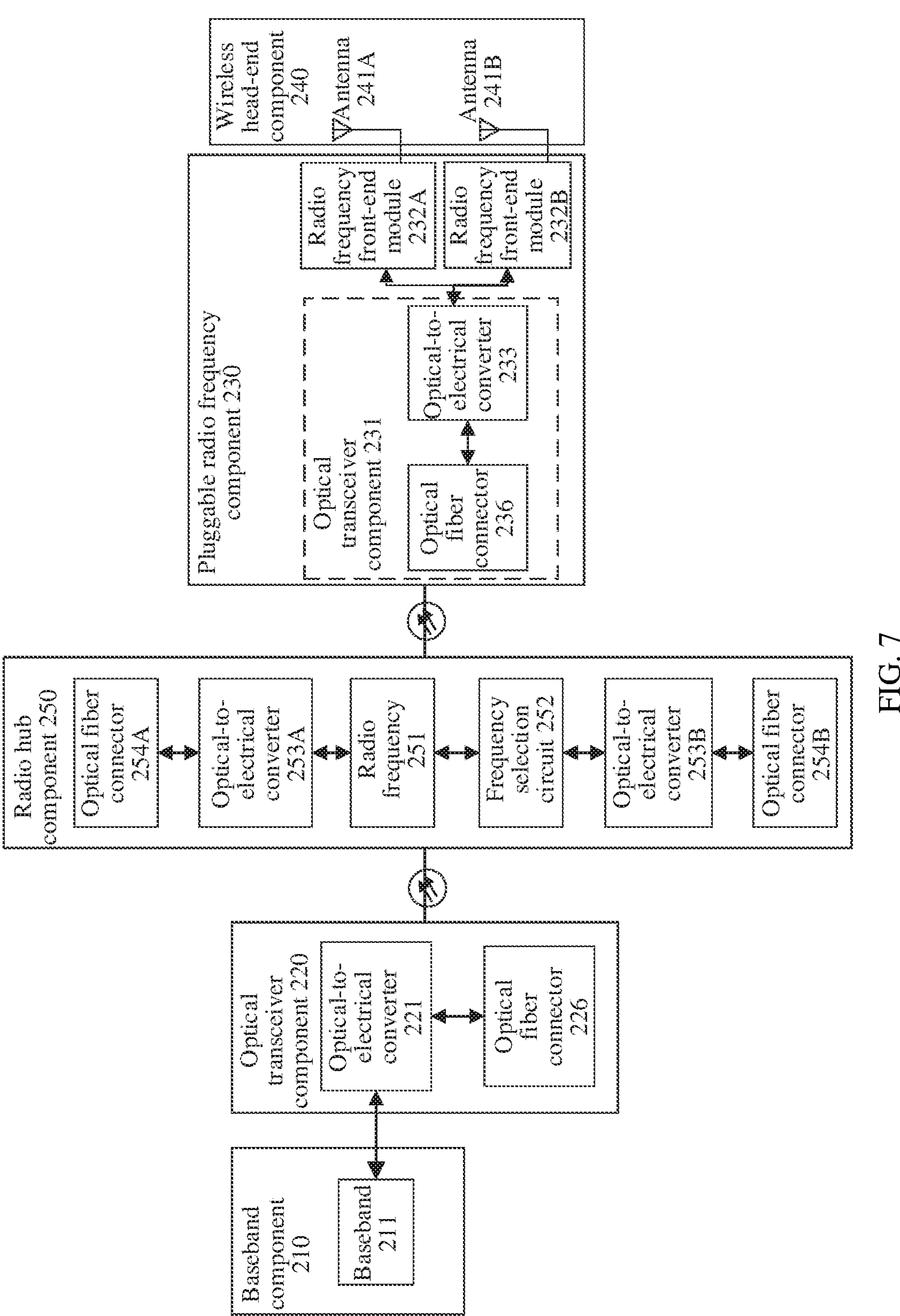
FIG. 7 is a schematic diagram of another structure of a distributed wireless system according to an embodiment of this application.
Figure 8:
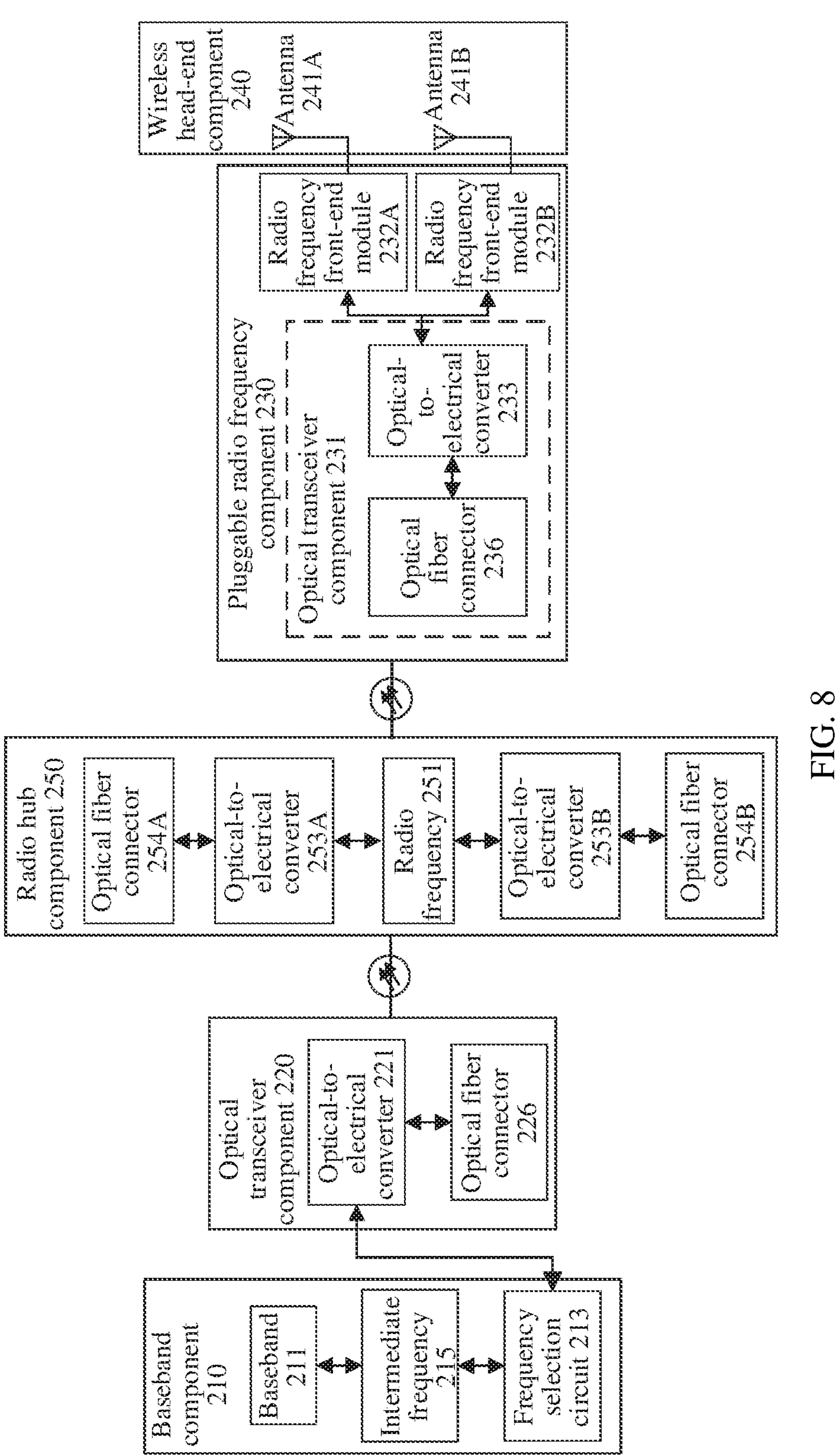
FIG. 8 is a schematic diagram of another structure of a distributed wireless system according to an embodiment of this application.

For example, when the pluggable radio frequency component 300 is used in the distributed wireless system 200, a schematic diagram of a structure of a distributed wireless system 200 is shown in FIG. 5, FIG. 6, FIG. 7, or FIG. 8. FIG. 5 is a schematic diagram of a structure of integrating a baseband component 210 and an optical transceiver component 220 into a same physical device. FIG. 6 is a schematic diagram of a structure of connecting an optical transceiver component 220 to a baseband component 210 in a plugging manner. FIG. 7 and FIG. 8 each are a schematic diagram of a structure of a distributed wireless system 200 including a radio hub component. In the schematic diagram of FIG. 5, FIG. 6, FIG. 7, or FIG. 8, the pluggable radio frequency component 230 is the pluggable radio frequency component 300. The optical transceiver component 231 is the optical transceiver component 302. The radio frequency front-end module 232 is the radio frequency front-end module 301. For ease of description, the laser 311, the laser driver 312, and the detector 313 are not shown in the schematic diagram of the structure of the distributed wireless system 200 in this application. Instead, the laser 311, the laser driver 312, and the detector 313 are represented by using an optical-to-electrical converter 233. To be specific, the optical-to-electrical converter 233 includes the laser 311, the laser driver 312, and the detector 313. Similarly, an optical-to-electrical converter 221 in the optical transceiver component 220 also includes a laser, a laser driver, and a detector.

As shown in FIG. 5, when the distributed wireless system 200 does not include a relay device (that is, does not include the radio hub component 250), and the baseband component 210 and the optical transceiver component 220 are deployed on a same physical device, the baseband component 210 includes a baseband 211, a radio frequency 212, and a frequency selection circuit 213. The baseband 211 is configured to generate and process a baseband signal. The radio frequency 212 is used to convert the baseband signal into a radio frequency signal. The frequency selection circuit 213 is configured to select a useful radio frequency signal. The optical transceiver component 220 includes the optical-to-electrical converter 221 and an optical fiber connector 226. The optical-to-electrical converter 221 is configured to convert a radio frequency signal received from the baseband component 210 into an optical signal, and transmit the signal to the pluggable radio frequency component 230 through an optical fiber connected to the optical fiber connector 226. The wireless head-end component 240 includes an antenna 241. When the distributed wireless system 200 does not include a relay device, and the optical transceiver component 220 is connected to the baseband component 210 in a plugging manner, as shown in FIG. 6, the baseband component 210 needs to further include an optical connector 214, configured to connect to the optical transceiver component 220.

When the distributed wireless system 200 requires a relay device (to be specific, including the radio hub component 250) to be deployed remotely, the baseband component 210 and the radio hub component 250 may be implemented in different manners.

Optionally, as shown in FIG. 7, the baseband component 210 includes the baseband 211. The radio hub component 250 includes a radio frequency 251, a frequency selection circuit 252, an optical-to-electrical converter 253 (253A and 253B), and an optical fiber connector 254 (254A and 254B). Compared with FIG. 5 or FIG. 6, the distributed wireless system 200 deploys the radio frequency 212 and the frequency selection circuit 213 that originally belong to the baseband component 210 in a relay device, including the radio hub component 250. The optical transceiver component 220 converts the baseband signal generated by the baseband 211 into an optical signal, transmits the optical signal to the radio hub component 250 through an optical fiber, and then converts the optical signal into a radio frequency signal and sends the radio frequency signal to the pluggable radio frequency component 230, thereby implementing a long-distance signal transmission. In this scenario, functions of other components that are not described in the distributed wireless system 200 are shown above.

Optionally, as shown in FIG. 8, the baseband component 210 includes the baseband 211, an intermediate frequency 215, and the frequency selection circuit 213. The intermediate frequency 215 is used to convert the baseband signal generated by the baseband 211 into an intermediate frequency (IF) signal. The radio hub component 250 includes the radio frequency 251, the optical-to-electrical converter 253 (253A and 253B), and the optical fiber connector 254 (254A and 254B). The baseband 210 sends the intermediate frequency signal to the radio hub component 250 through the optical transceiver component 220, and converts, in the radio frequency 251 after conversion by the optical-to-electrical converter 253A, the intermediate frequency signal into a radio frequency signal. After the optical-to-electrical converter 253B converts the radio frequency signal into an optical signal, the optical fiber connector 254B sends the optical signal to the pluggable radio frequency component 230 through the optical fiber. The baseband component 210 first converts the baseband into an intermediate frequency signal for transmission, and then converts the intermediate frequency signal into a radio frequency signal in the radio hub component 250, thereby reducing signal attenuation on a transmission line and increasing a transmission distance of the distributed wireless system. In this scenario, functions of other components that are not described in the distributed wireless system 200 are shown above.

Figure 9:
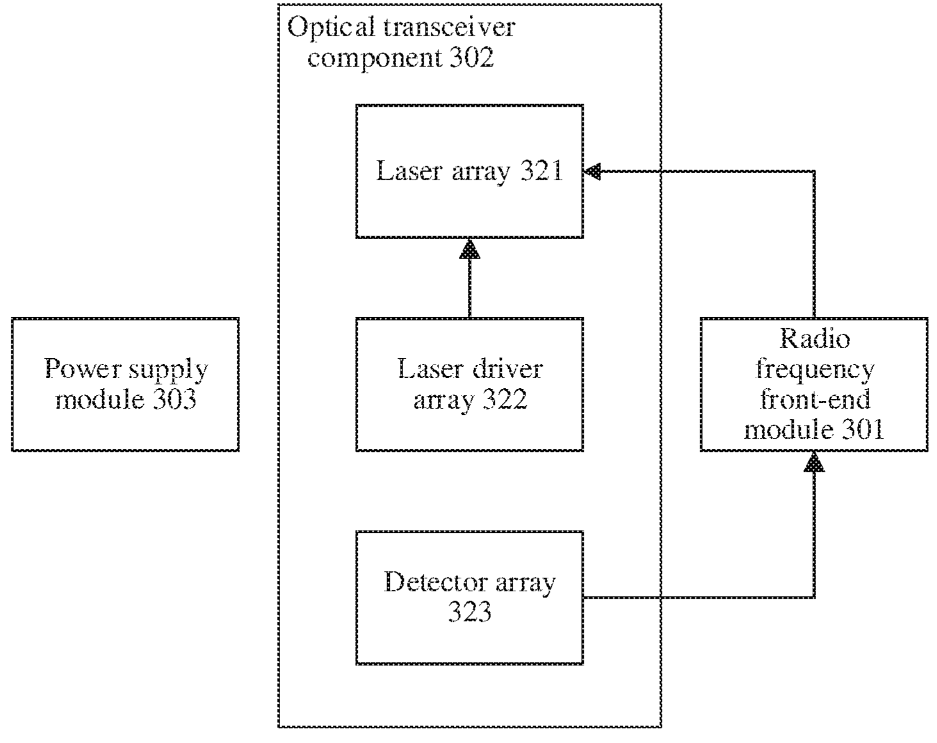
FIG. 9 is a schematic diagram of another structure of a pluggable radio frequency component according to an embodiment of this application.

In a possible implementation, when the pluggable radio frequency component 300 supports transmission of a multi-channel radio frequency signal, as an example, referring to FIG. 9, the pluggable radio frequency component 300 includes a radio frequency front-end module 301 and an optical transceiver component 302. The optical transceiver component 302 includes a laser array 321, a laser driver array 322, and a detector array 323. In this application, transmission of the multi-channel radio frequency signal is supported in a manner of forming an array through a plurality of devices of a same type. Therefore, the laser array 321 may include a plurality of lasers 311, the laser driver array 322 includes a plurality of laser drivers 312, and the detector array 323 includes a plurality of detectors 313. When the pluggable radio frequency component 300 is used in the distributed wireless system 200, based on the number of antennas 241 in the wireless head-end component 240, the pluggable radio frequency component 300 may further include a plurality of radio frequency front-end modules 301.

When the pluggable radio frequency component 300 that supports transmission of the multi-channel radio frequency signal is used in the distributed wireless system 200, the distributed wireless system 200 may transmit the multi-channel radio frequency signal by using a wavelength division multiplexing or parallel single-mode fiber technology. Therefore, based on different manners of transmission, the pluggable radio frequency component 300 needs to further include different types of components.

Figure 10:
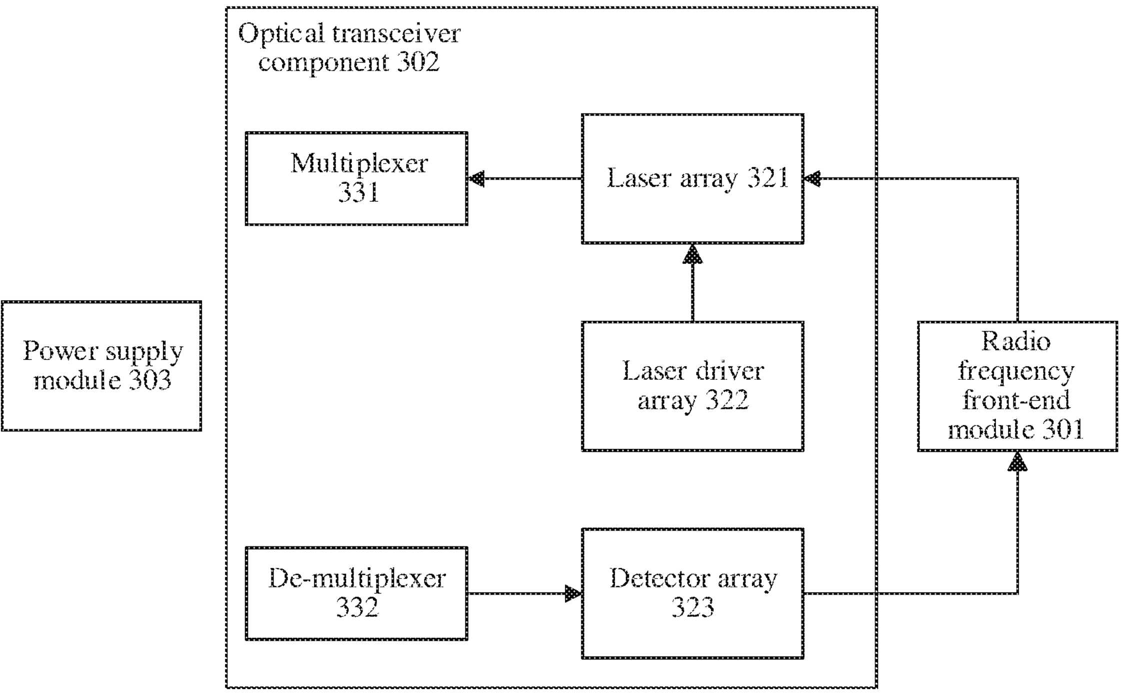
FIG. 10 is a schematic diagram of another structure of a pluggable radio frequency component according to an embodiment of this application.
Figure 11:
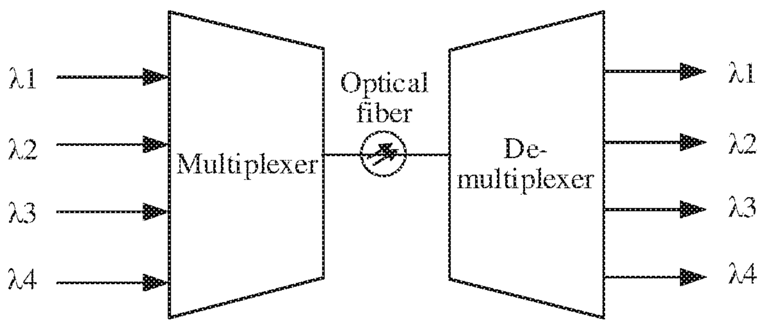
FIG. 11 is a schematic flowchart of transmitting a multi-channel radio frequency signal through wavelength division multiplexing according to an embodiment of this application.

Optionally, when the distributed wireless system 200 transmits the multi-channel radio frequency signal through wavelength division multiplexing, as shown in FIG. 10, the optical transceiver component 302 further includes a multiplexer 331 and a de-multiplexer 332. FIG. 11 is a schematic flowchart of transmitting a multi-channel radio frequency signal through wavelength division multiplexing. As shown in FIG. 11, light λ1 to λ4 of different wavelengths are multiplexed by a multiplexer into one light for transmission in an optical fiber, and the one light is de-multiplexed by a de-multiplexer to obtain light λ1 to λ4 of different wavelengths, to implement signal transmission in the distributed wireless system 200.

Figure 12:
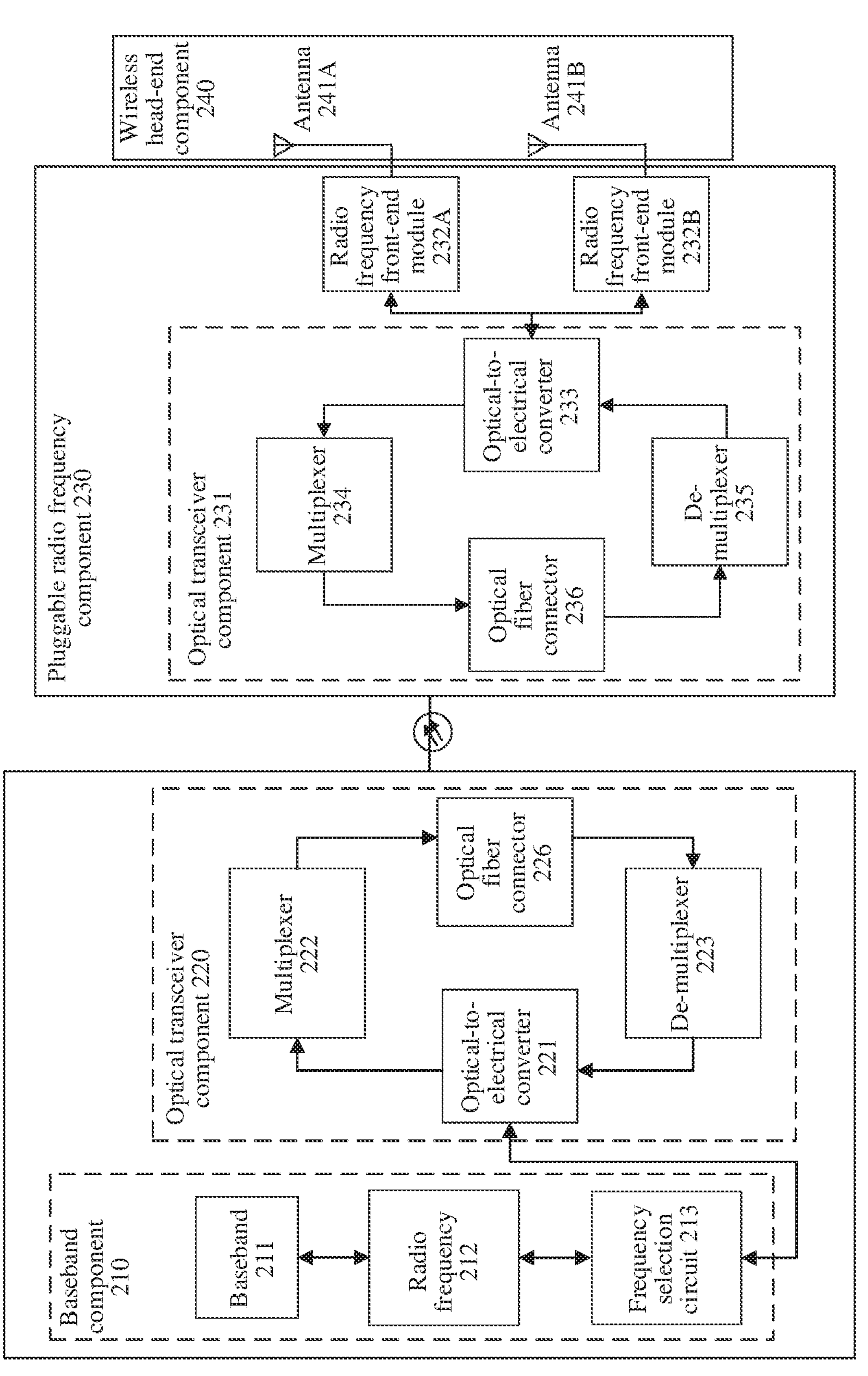
FIG. 12 is a schematic diagram of another structure of a distributed wireless system according to an embodiment of this application.
Figure 13:
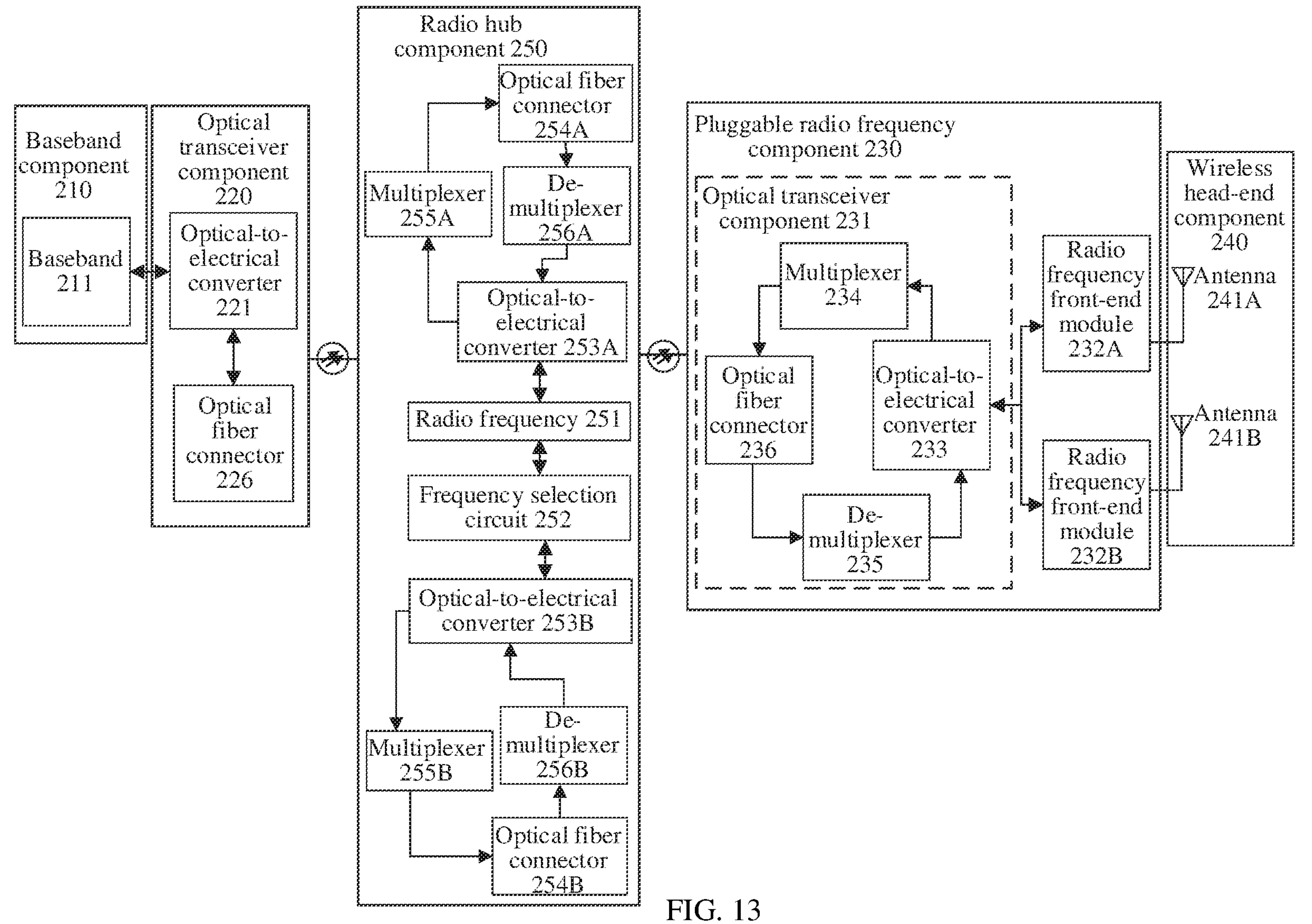
FIG. 13 is a schematic diagram of another structure of a distributed wireless system according to an embodiment of this application.

For example, when the pluggable radio frequency component 300 implemented by using the wavelength division multiplexing technology is used in the distributed wireless system 200, a schematic diagram of a corresponding structure is shown in FIG. 12 or FIG. 13. FIG. 12 is a schematic diagram of a structure of a distributed wireless system 200 that does not include a radio hub component 250. FIG. 13 is a schematic diagram of a structure of a distributed wireless system 200 that includes a radio hub component 250 as a relay device. A multiplexer 234 in FIG. 12 and FIG. 13 is a multiplexer 331, and the de-multiplexer 235 is a de-multiplexer 332. As shown in FIG. 12, the optical transceiver component is directly connected to the pluggable radio frequency component 230, and the pluggable radio frequency component transmits the multi-channel radio frequency signal through the multiplexer 234 and the de-multiplexer 235. Therefore, the optical transceiver component 220 also needs a multiplexer 222 and a de-multiplexer 223, to cooperate with the pluggable radio frequency component to transmit the multi-channel radio frequency signal. However, as shown in FIG. 13, the optical transceiver component 220 is connected to the pluggable radio frequency component 230 through the radio hub component 250. Therefore, the optical transceiver component 220 does not need to be changed. Only the radio hub component 250 needs to include a multiplexer 255 (255A and 255B) and a de-multiplexer 256 (256A and 256B), to cooperate with the pluggable radio frequency component 230 to transmit the multi-channel radio frequency signal. In this scenario, functions of other components that are not described in the distributed wireless system 200 are shown above.

Figure 14:
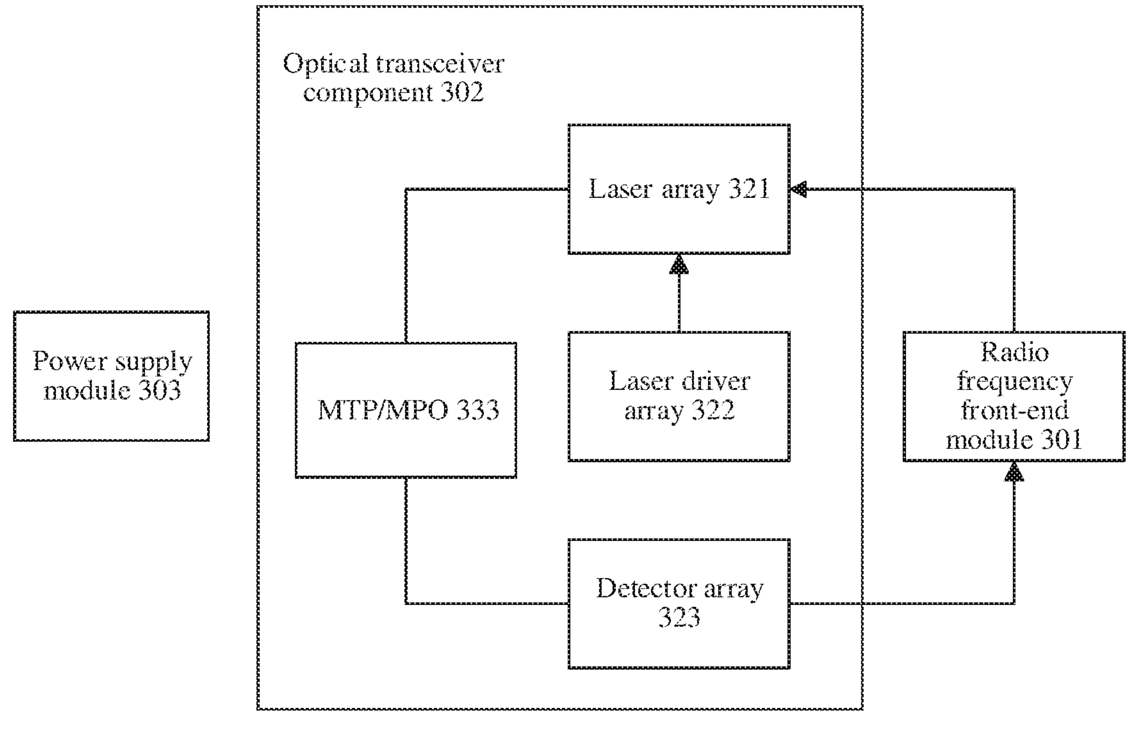
FIG. 14 is a schematic diagram of another structure of a pluggable radio frequency component according to an embodiment of this application.
Figure 15:
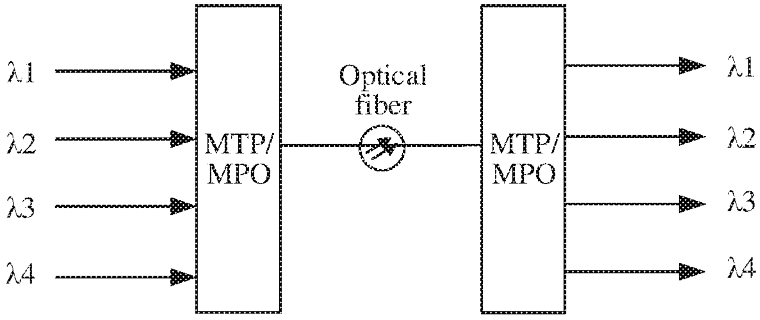
FIG. 15 is a schematic flowchart of transmitting a multi-channel radio frequency signal through a PSM according to an embodiment of this application.

Optionally, when the pluggable radio frequency component 300 transmits the multi-channel radio frequency signal through a PSM, a schematic diagram of a corresponding structure is shown in FIG. 14. In addition to the laser array 321, the laser driver array 322, and the detector array 323, the optical transceiver component 302 further includes an MTP/MPO connector 333. FIG. 15 is a schematic flowchart of transmitting a multi-channel radio frequency signal through a PSM. As shown in FIG. 15, optical signals λ1 to λ4 of different wavelengths are combined into one optical signal through an MTP/MPO connector on the left side for transmission in an optical fiber, and the one optical signal is de-multiplexed by an MTP/MPO connector on the right side to obtain optical signals λ1 to λ4 of different wavelengths.

Figure 16:
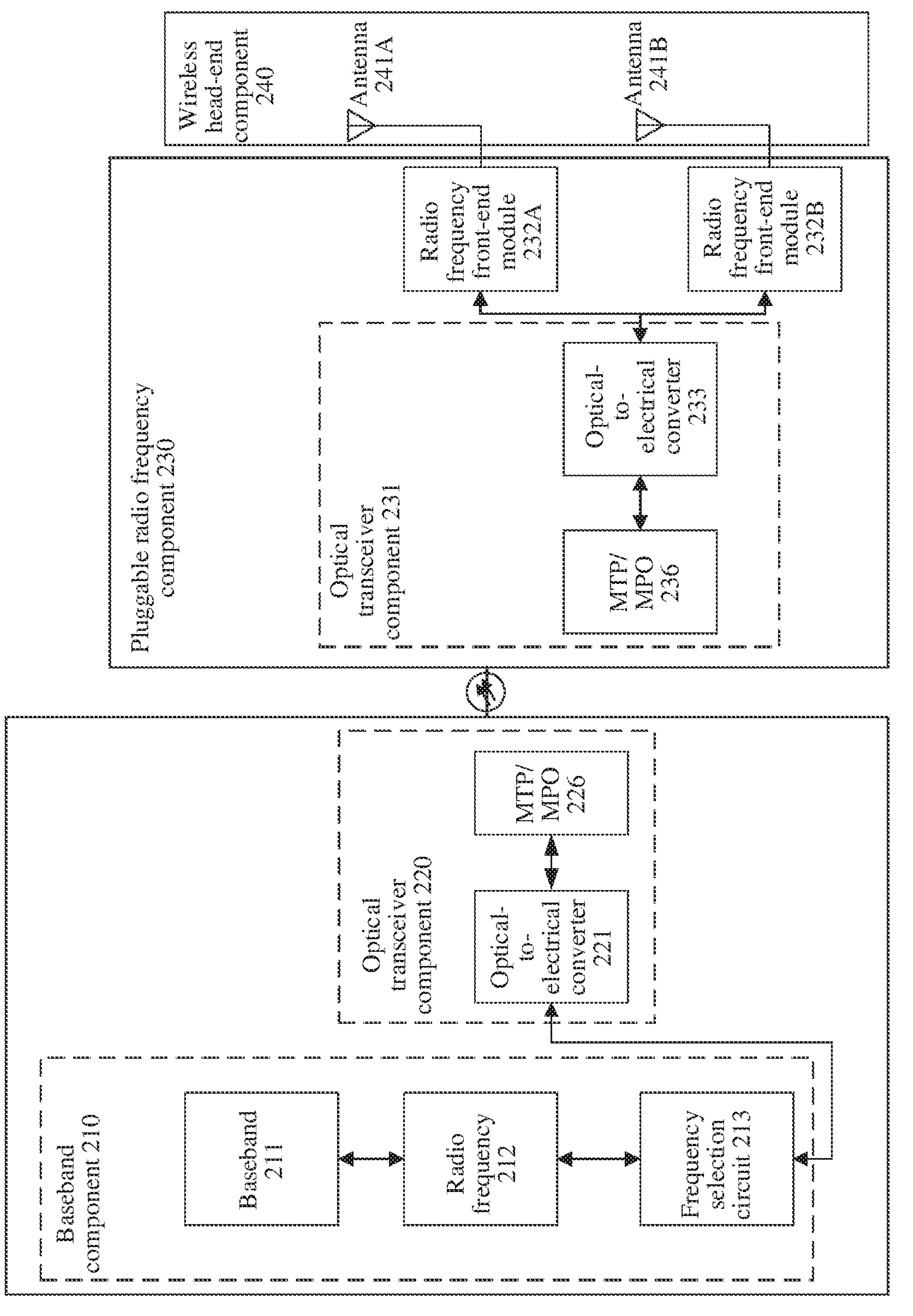
FIG. 16 is a schematic diagram of another structure of a distributed wireless system according to an embodiment of this application.
Figure 17:
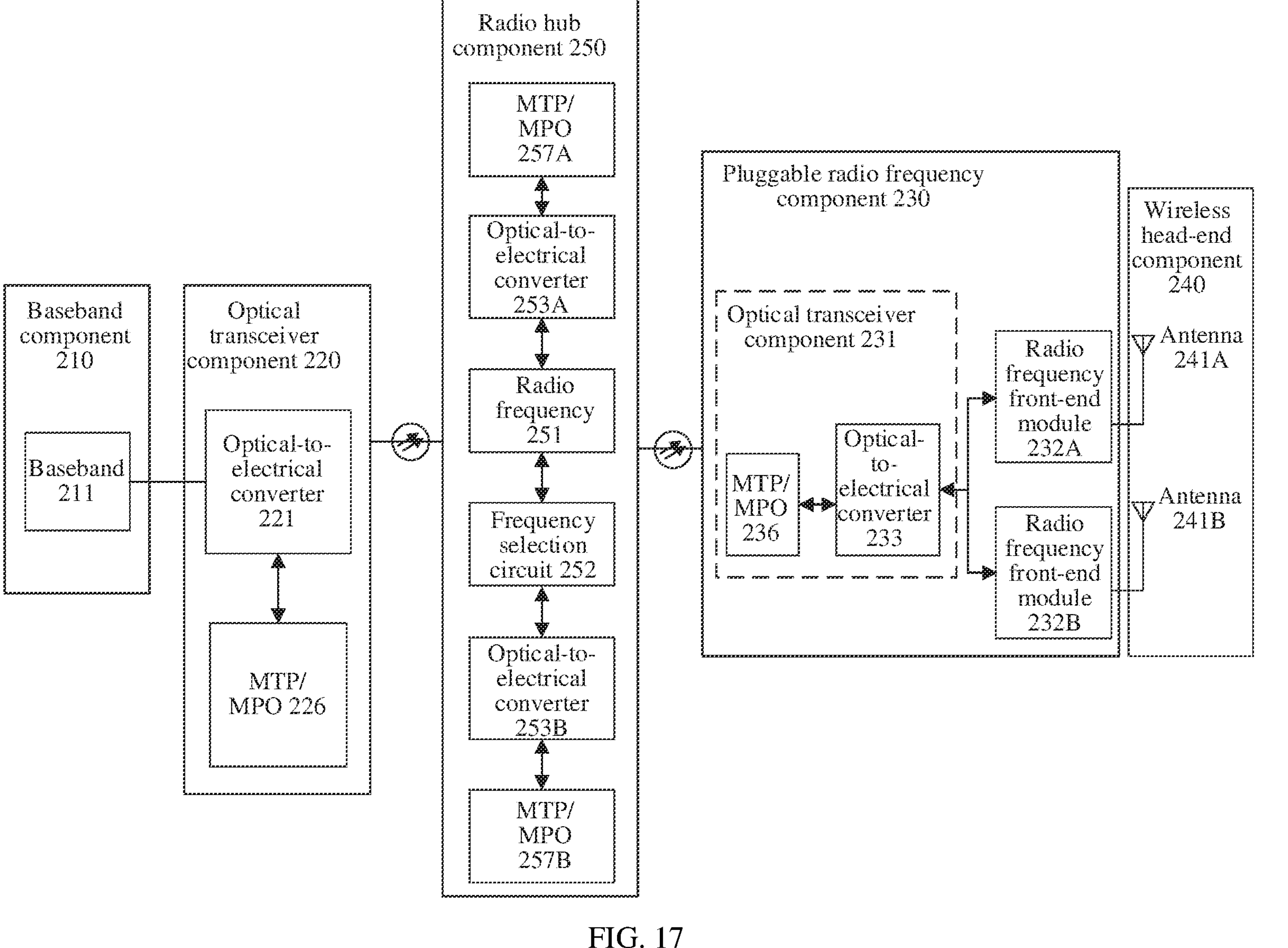
FIG. 17 is a schematic diagram of another structure of a distributed wireless system according to an embodiment of this application.

For example, when the pluggable radio frequency component 300 implemented by using the PSM technology is used in the distributed wireless system, a schematic diagram of a corresponding structure is shown in FIG. 16 or FIG. 17. FIG. 16 is a schematic diagram of a structure of a distributed wireless system 200 that does not include a radio hub component 250. FIG. 17 is a schematic diagram of a structure of a distributed wireless system 200 that includes a radio hub component 250 as a relay device. The MTP/MPO connector 333 is a MTP/MPO connector 236 in FIG. 16 and FIG. 17. The pluggable radio frequency component 230 is connected to the optical transceiver component 220 or the radio hub component 250 by using the MTP/MPO connector 236. Therefore, when the pluggable radio frequency component 230 is connected to the optical transceiver component 220, the optical transceiver component 220 needs to include the MTP/MPO connector 226. Alternatively, when the pluggable radio frequency component 230 is connected to the radio hub component 250, the radio hub component 250 needs to include an MTP/MPO 256 (256A and 256B). In this scenario, functions of other components that are not described in the distributed wireless system 200 are shown above.

Figure 18:
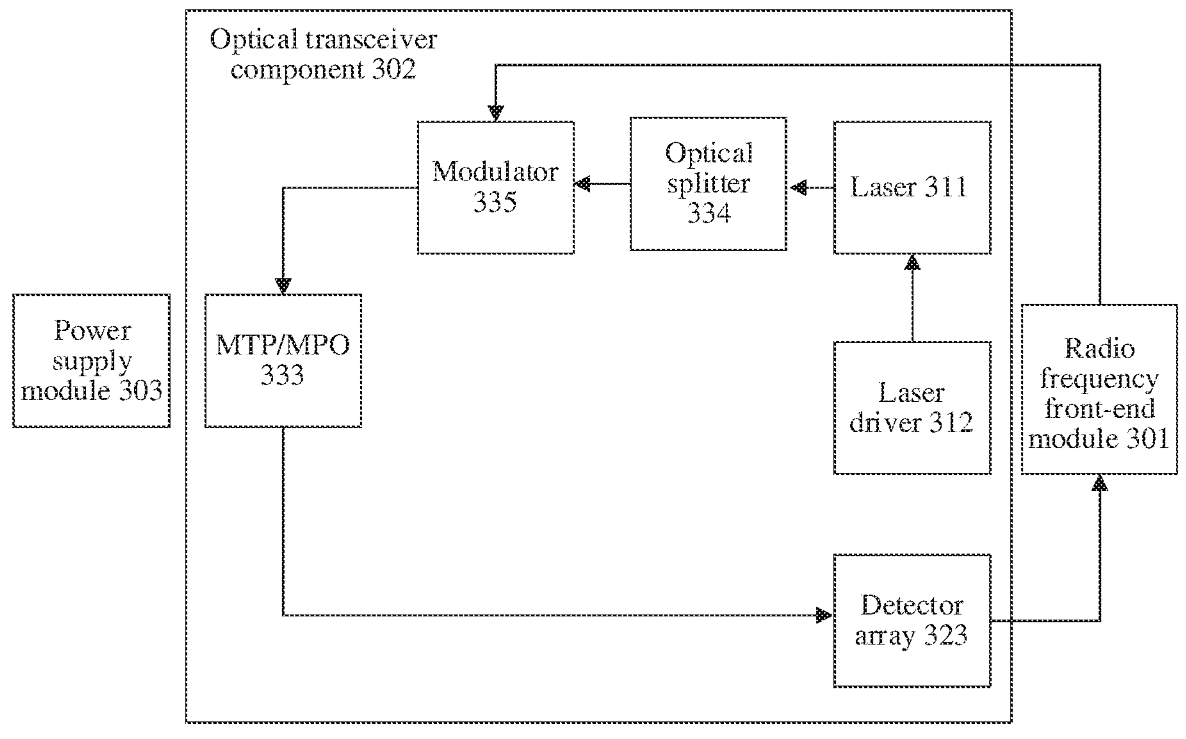
FIG. 18 is a schematic diagram of another structure of a pluggable radio frequency component according to an embodiment of this application.
Figure 19:
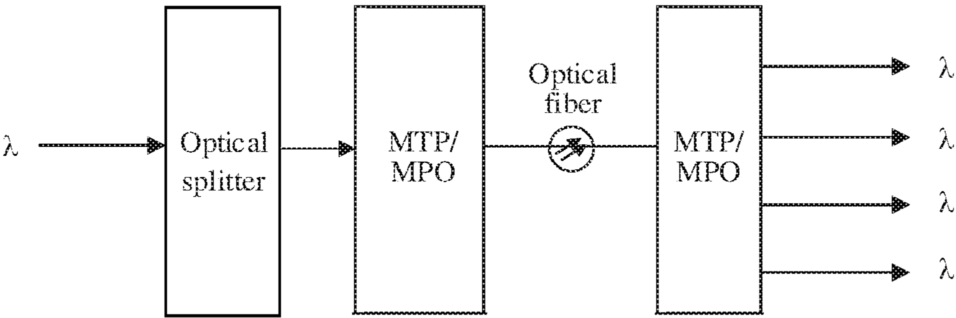
FIG. 19 is another schematic flowchart of transmitting a multi-channel radio frequency signal through a PSM according to an embodiment of this application.

Optionally, when the pluggable radio frequency component 300 transmits the multi-channel radio frequency signal through the PSM, an optical splitting technology may be further used to reduce the number of lasers and laser drivers, to reduce costs. As shown in FIG. 18, the optical transceiver component 302 includes the laser 311, the laser driver 312, the detector array 323, an optical splitter 334, a modulator 335, and the MTP/MPO connector 333. As shown in FIG. 19, a single optical signal λ emitted by the laser is split by the optical splitter, is transmitted in an optical fiber through the MTP/MPO connector, and then is parsed into a plurality of optical signals λ through the MTP/MPO. In this manner, the pluggable radio frequency component 300 may transmit the multi-channel radio frequency signal when including only a single laser.

Figure 20:
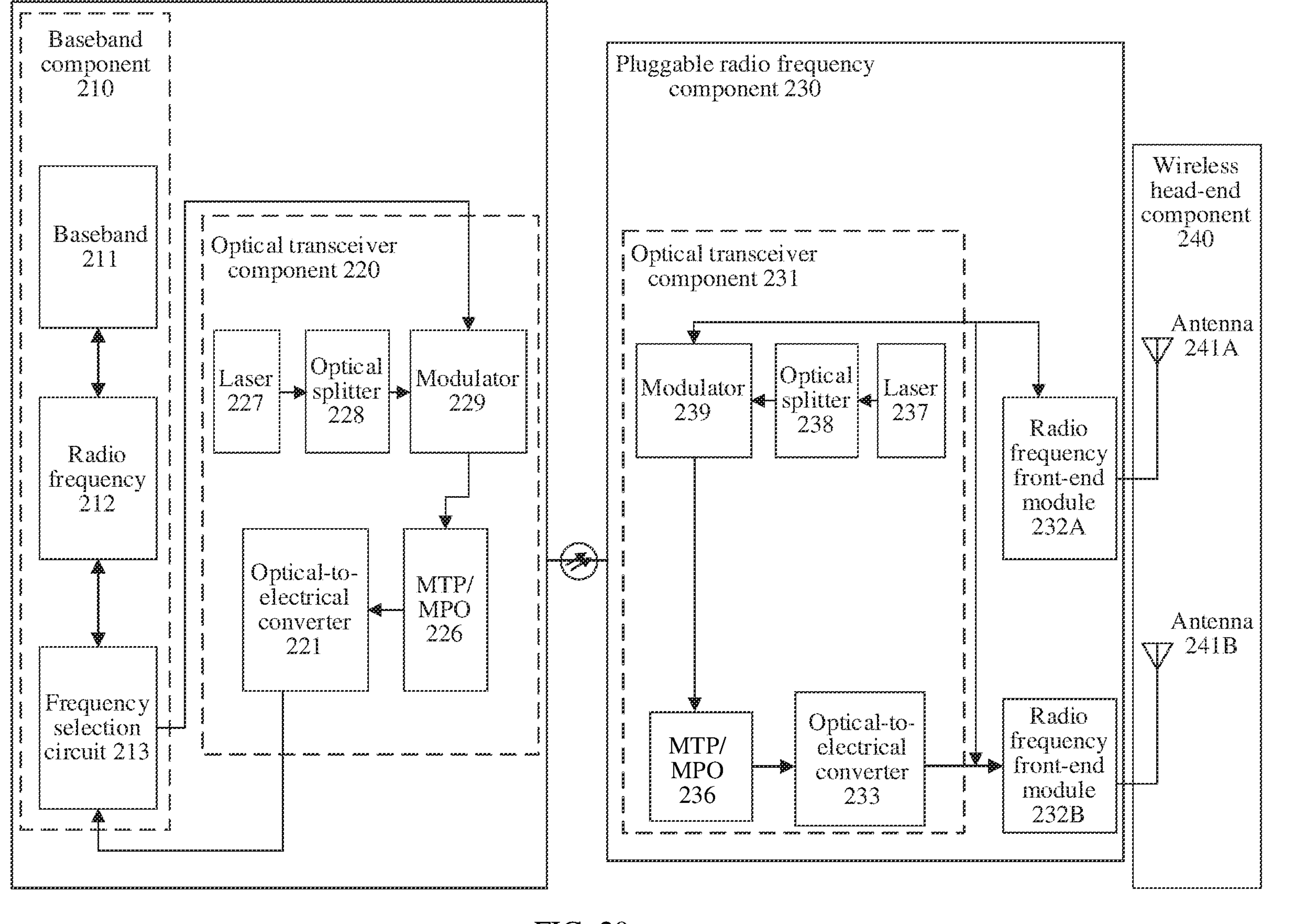
FIG. 20 is a schematic diagram of another structure of a distributed wireless system according to an embodiment of this application.
Figure 21:
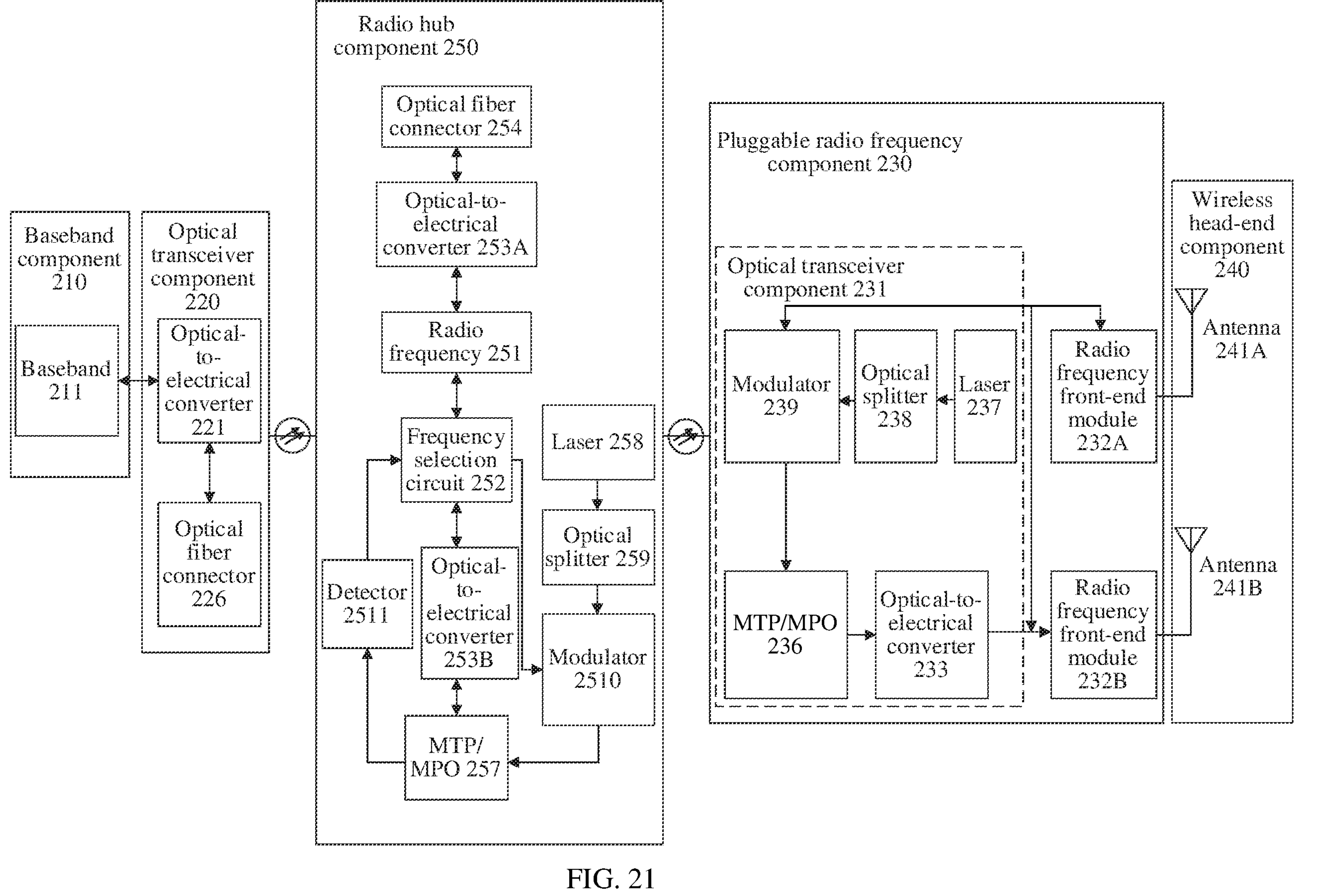
FIG. 21 is a schematic diagram of another structure of a distributed wireless system according to an embodiment of this application.

For example, when the pluggable radio frequency component 300 is used in the distributed wireless system 200, a schematic diagram of a corresponding structure is shown in FIG. 20 or FIG. 21. FIG. 20 is a schematic diagram of a structure of a distributed wireless system that does not include a radio hub component 250. FIG. 21 is a schematic diagram of a structure of a distributed wireless system 200 that includes a radio hub component 250 as a relay device. In FIG. 20 and FIG. 21, an optical splitter 238 is the optical splitter 334, and a modulator 239 is the modulator 335. As shown in FIG. 20, to cooperate with an optical splitting function of the pluggable radio frequency component 230, the optical transceiver component 220 needs to further include a laser 227, an optical splitter 228, and a modulator 229. It can be learned from FIG. 21 that, the radio hub component 250 is connected to the pluggable radio frequency component 230. Therefore, the optical transceiver component 220 does not need to be changed. Only the radio hub component 250 needs to include a laser 258, an optical splitter 259, a modulator 2510, and a detector 2511, to cooperate with the pluggable radio frequency component 230 to transmit the multi-channel radio frequency signal by using an optical splitting technology. In this scenario, functions of other components that are not described in the distributed wireless system 200 are shown above.

It should be noted that embodiments provided in this application are merely examples. A person skilled in the art may clearly know that, for convenience and conciseness of description, in the foregoing embodiments, embodiments emphasize different aspects, and for a part not described in detail in one embodiment, reference may be made to related description of another embodiment. The features disclosed in embodiments, claims, and accompanying drawings of this application may exist independently or in combination. This is not limited herein.

What is claimed is:

1. A system, comprising:

a first baseband component configured to generate a radio frequency signal;

an optical transceiver component configured to convert the radio frequency signal to an optical signal and transmit the optical signal over an optical fiber, wherein the first baseband component and the optical transceiver component are located in a same physical device or the optical transceiver component is connected, in a plugging manner, to a physical device to which the first baseband component belongs;

a first pluggable radio frequency component connected to the optical transceiver component through the optical fiber; and a wireless head-end component, wherein the first baseband component is configured to provide a radio frequency signal to the first pluggable radio frequency component through the optical transceiver component, wherein the first pluggable radio frequency component is connected to the wireless head-end component in a plugging manner, and wherein the system is configured to be upgraded, in a first manner, by replacing the first pluggable radio frequency component with a second pluggable radio frequency component without replacing the first baseband component or the wireless head-end component.

2. The system according to claim 1, wherein the first pluggable radio frequency component comprises at least one radio frequency front-end module, and the optical transceiver component comprises at least one laser, at least one laser driver, and at least one detector.

3. The system according to claim 2, wherein the wireless head-end component is located at a wireless access point.

4. The system according to claim 1, further comprising a radio hub component, wherein the radio hub component connects the optical transceiver component to the first pluggable radio frequency component through the optical fiber.

5. The system according to claim 4, wherein the first pluggable radio frequency component comprises at least one radio frequency front-end module, and the optical transceiver component comprises at least one laser, at least one laser driver, and at least one detector.

6. The system according to claim 4, wherein the wireless head-end component is located at a wireless access point.

7. The system according to claim 1, wherein the same physical device is a switch.

8. The system according to claim 1, wherein the wireless head-end component is located at a wireless access point.

9. The system according to claim 1, wherein the system is configured to be upgraded, in a second manner, by replacing the first baseband component with a second baseband component without replacing the first pluggable radio frequency component or the wireless head-end component.

10. The system according to claim 9, wherein the system is configured to be upgraded in the second manner in response to a wireless protocol upgrade that does not change a wireless spectrum.

11. A radio frequency component, comprising:

an optical transceiver component comprising:

an optical fiber connector; and an optical-to-electrical converter comprising at least one laser, at least one laser driver, and at least one detector, wherein the optical fiber connector is configured to connect the optical-to-electrical converter to an optical fiber to receive an optical signal through the optical fiber, and wherein the optical-to-electrical converter is configured to convert the optical signal to an electrical signal; and at least one radio frequency front-end module, wherein the radio frequency component is pluggable into a wireless head-end component of a system, wherein the system comprises a baseband component, and wherein the system is configured to be upgraded, in a first manner, by replacing the radio frequency component with another radio frequency component without replacing the baseband component or the wireless head-end component.

12. The radio frequency component according to claim 11, further comprising a power supply module, wherein the power supply module is configured to supply power to the radio frequency component, and the power supply module is configured to support obtaining power locally or obtaining power remotely.

13. The radio frequency component according to claim 12, wherein the radio frequency component is an optical module.

14. The radio frequency component according to claim 11, wherein the optical transceiver component further comprises a multiplexer and a de-multiplexer.

15. The radio frequency component according to claim 11, wherein the optical fiber connector is an MTP/MPO connector.

16. The radio frequency component according to claim 11, wherein the optical transceiver component further comprises an optical splitter and a modulator.

17. The radio frequency component according to claim 11, wherein the radio frequency component is an optical module.

* * * * *